July 20, 1965  R. R. BALAGUER  3,195,829
POWER UNIT-REEL ASSEMBLY FOR FISHING RODS
Filed July 1, 1963  3 Sheets-Sheet 1
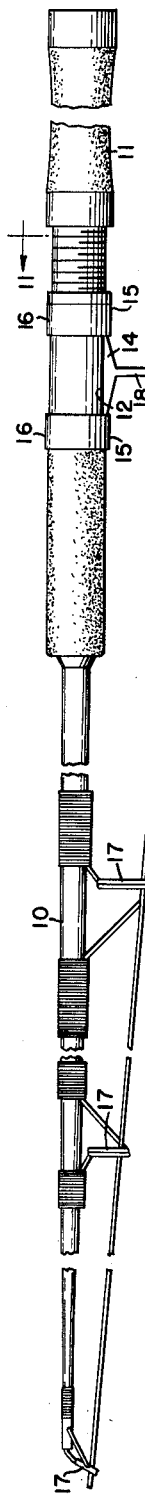
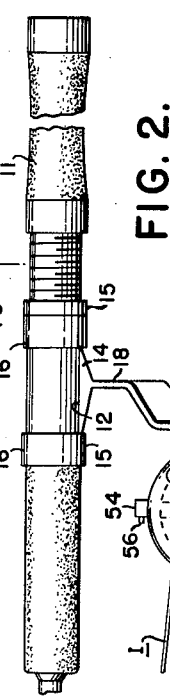
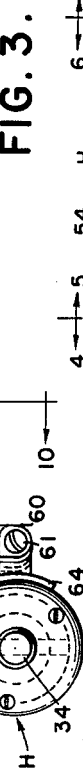
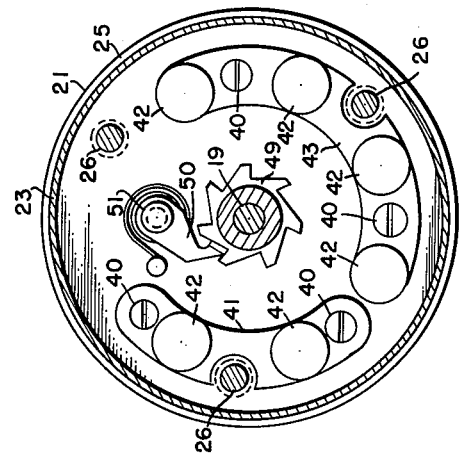
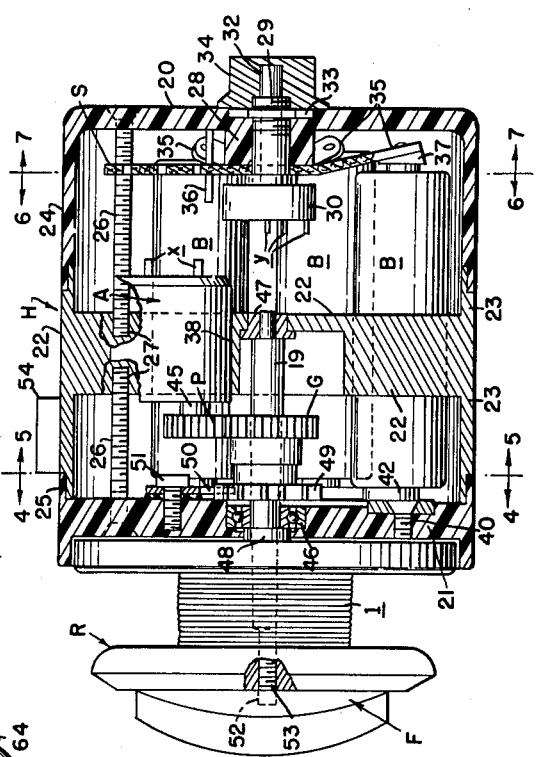
INVENTOR
RODOLFO R. BALAGUER
BY *Ephram Cumming*
ATTORNEY July 20, 1965   R. R. BALAGUER   3,195,829
POWER UNIT-REEL ASSEMBLY FOR FISHING RODS
Filed July 1, 1963   3 Sheets-Sheet 2
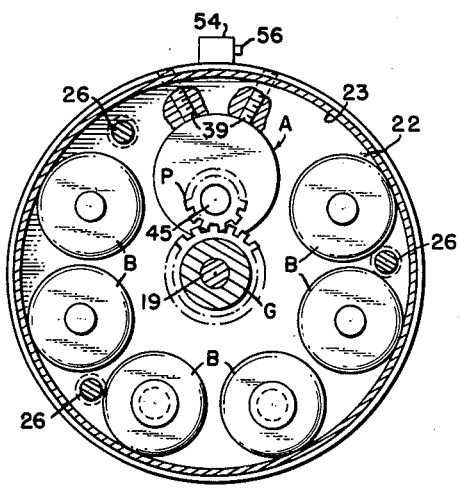
FIG. 5.
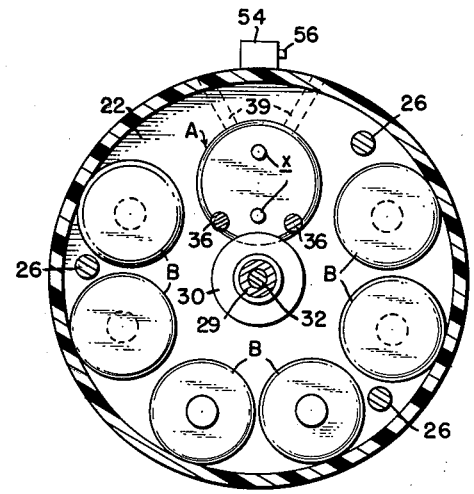
FIG. 6.
FIG. 7.
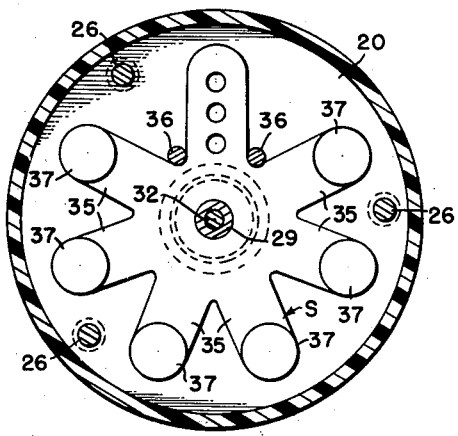
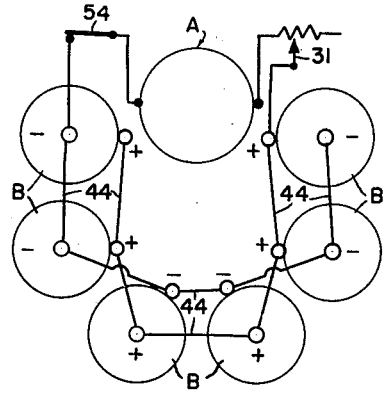
FIG. 9.
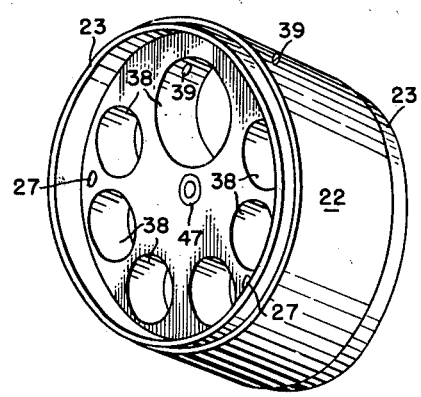
FIG. 8.
INVENTOR
RODOLFO R. BALAGUER
BY
ATTORNEY July 20, 1965   R. R. BALAGUER   3,195,829
POWER UNIT-REEL ASSEMBLY FOR FISHING RODS
Filed July 1, 1963   3 Sheets-Sheet 3
FIG. 10.
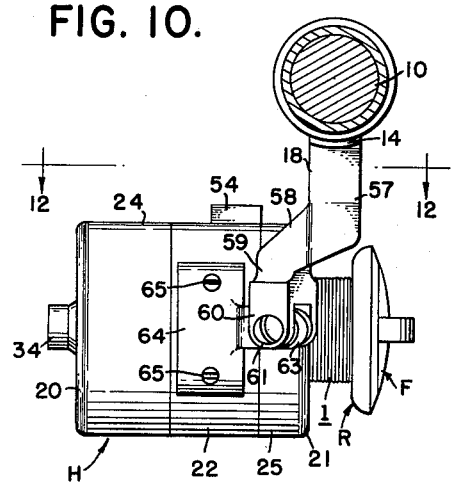
FIG. 11.
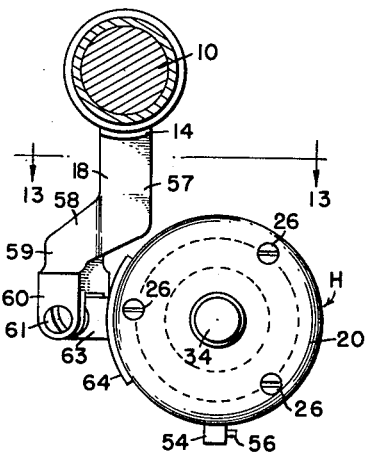
FIG. 12.
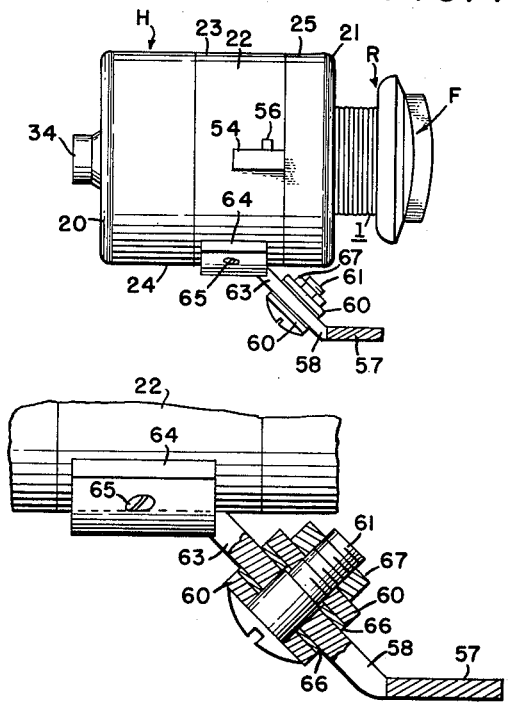
FIG. 14.
FIG. 13.
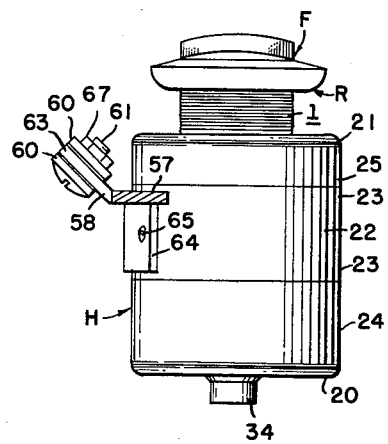
INVENTOR
RODOLFO R. BALAGUER
BY
ATTORNEY

United States Patent Office 3,195,829
Patented July 20, 1965

3,195,829
POWER UNIT-REEL ASSEMBLY FOR
FISHING RODS
Rodolfo R. Balaguer, Fort Lauderdale, Fla., assignor to
J. D. Hodges and Company Limited Partnership, Kingston, Jamaica, a limited partnership of Cuba
Filed July 1, 1963, Ser. No. 292,015
10 Claims. (Cl. 242—84.2)

The invention relates to a spinning type of fishing reel united to and operable by a self-contained power unit all of whose components are compactly arranged within a small enclosing housing therefor, and to a swiveled mounting for such a power unit-reel assembly upon a rod having a conventional seat and locking means therefor, the mounting providing for movement of the reel to (1) a casting position wherein its axis is aligned with a line extending centrally through the several guides commonly affixed to the rod, and to (2) a winding position wherein the reel axis is disposed normally of the rod with a medial portion of the reel spool located at one end of an axial line extending through the several guides.

The term "self-contained power unit," as herein used, comprises a source of electrical energy, e.g., dry chemical batteries, and a motor which is operable thereby, both enclosed within a common housing. It may also include other auxiliary means such as a switch and a rheostat interposed in the electrical circuit whereby to control operation of the motor, and a gear reduction in the transmission leading from the motor, the transmission extending to a reel spool mounted on the housing exteriorly thereof for receiving and releasing line windings. Such a unit, when swivelly mounted upon a conventional fishing rod by means such as will hereafter be described, is movable in its entirety between optimum casting and winding positions in both of which it remains spaced an equal distance from the rod, preferably upon its under or far side as viewed by the user. As a result, the reel spool is free to release the line with a minimum of resistance, when a casting operation is performed, and when rewinding takes place the windings are distributed more evenly and smoothly lengthwise of the reel spool. The inclusion within a housing of a self-contained power unit along with driving connections to the reel spool itself when carried exteriorly of the housing, poses a special problem arising from the increased size of the housing required for accommodation and protection of all the operating parts. This problem also includes the provision of a satisfactory mounting for such a housing whereby it may be shifted between the two operating positions just noted. These difficulties have been met by the present improved mounting for the housing which provides for shifting of the unitary power unit-reel assembly between its two operating positions wherein only a minimum resistance is offered to lineal movement of the line to and from the reel spool.

In a motorized reel of the kind described, it is important that the total size and weight be held to a minimum; that an assembly of batteries, motor, and motion-transmitting shafts, including a gear reduction therein, be accommodated compactly within a protecting housing therefor of minimum size and maximum accessibility; that the various parts within the housing be fixedly mounted in place, yet be readily available for adjustments, periodic lubrication and cleaning, and replacement whenever necessary; that the swiveled mounting whereon the motorized reel is carried provide between the rod and reel an adequate space for reception of the fingers which are engaged in holding and manipulating the rod; that the swiveled mounting permit the reel to occupy alternately line-casting and winding positions in each of which its spacing from the rod is the same; and that a control switch by which to start and stop operations of the motor be arranged exteriorly of the housing at a point which is convenient for manipulation whenever the reel occupies its line-winding position. All these objectives are realized in full measure by the motorized reel of this invention.

In addition to these several objects and advantages, others will appear hereinafter from the detailed description of the preferred embodiment of the invention as illustrated in the accompanying drawings in the manner following:

FIGURE 1, which is an elevational view of a fishing rod in a horizontal position, shows mounted on its under side the present motorized reel in a line-casting position; FIG. 2, which is a similar view confined to the handle end portion of the rod, shows the reel disposed in line-winding position; FIG. 3 is a central longitudinal section through the motorized reel; FIGS. 4, 5 6 and 7 are transverse sectional views taken, respectively, on lines 4—4, 5—5, 6—6, and 7—7 of FIG. 3, looking in the direction of the arrows in each case; FIG. 8, which is a perspective view of the central body portion of the power unit housing per se, shows the cellular mountings therewithin for the motor and batteries; FIG. 9 is a diagram of the electrical circuit interconnecting all units of the motorized reel; FIG. 10 is a cross section through the rod, taken on line 10—10 of FIG. 2, showing in elevation the mounting for the reel, the spool of the latter being in its line-winding position; FIG. 11 is a similar view, taken on line 11—11 of FIG. 1 with the reel spool disposed in its line-casting position; FIGS. 12 and 13 are sectional views, the former taken on line 12—12 of FIG. 10 and the latter on line 13—13 of FIG. 11, the reel spool, in elevation, being shown in line-winding and line-casting positions in these two figures; and FIG. 14 is a fragmentary sectional view, similar to FIG. 12, and somewhat enlarged to show in axial section the joint at the pivotal connection between the two arms of the bracket which carries the reel.

The fishing rod is conventional in that its shaft 10 is enlarged in one end portion where a handle grip 11 is provided, also a seat 12 along one side of the rod for reception of an elongated base plate 14 whose opposite end portions are clampingly received within open-ended recesses 15 each radially formed in a collar 16 which surrounds the seat, one or both of these collars being slidable toward and from the other. The interengaging faces of the base plate and collar recesses are inclined so as to produce therebetween a frictional interlock which increases as one collar is advanced toward the other. One or more aligned guides 17 of circular contour are fixedly carried upon the rod, in spaced relation lengthwise thereof, these guides being aligned also with the reel seat 12 and being graduated in size with the smallest guide disposed at the tip end of the rod.

Fixedly extended from the base plate 14, at a point intermediately of its ends, is a rigid arm 18 which is comprised in a swiveled bracket mounting for a housing H to be described in detail at a later point herein. This housing which is elongated and generally cylindrical in form accommodates within itself (1) a self-contained power unit comprising a motor A and an energy source therefor in a system of dry chemical batteries B; and exteriorly of itself (2) a reel R, a friction brake F therefor, and a reel shaft 19 the latter being extended through one end of the housing into its interior where it carries a gear G in mesh with a pinion P mounted fast on the drive shaft of the motor. A small cylindrical casing arranged within the housing H adjacent its cylindrical walls, and with its axis in parallelity therewith, encloses the motor A. Elsewhere within the housing, symmetrically disposed in parallelity adjacent its walls, is the system of batteries B, here shown as six in number and all of the same length, providing the energy for operation of the motor to which it is connected by suitable conductors for the purpose.

The housing H desirably comprises at one end a cap plate 20 of plastic or the like, a bearing plate 21 at the opposite end, also of plastic or the like, and therebetween a relatively thick, disk-like circular body 22 of aluminum or the like (see FIG. 8) formed with oppositely disposed circular flanges 23 in interfitting engagement with like flanges 24 and 25 extending, respectively, from the cap and bearing plates 20 and 21. Suitable means, such as screw bolts 26 extending through the cap and bearing plates for anchorage in tapped holes 27 in the body 22, may be provided for fixedly, yet releasably, securing the body and the two end plates together in unitary relation whereby the operating parts therewithin are fully enclosed and protected against water and other elements.

The cap plate 20 is provided centrally with an inwardly extending circular boss 28 formed therethrough with an axial opening wherein is fitted an elongated sleeve 29 joined at its inner end to a chambered head 30 adapted to engage the inner face of the cap plate 20. This head encloses a rheostat comprising a movable element 31 (FIG. 9) affixed to the inner end of a spindle 32 which is extended axially within the sleeve. A nut 33 applied to the outer end portion of the sleeve which is provided with cooperating threads for this purpose, is adapted to be rotatably advanced against the outer face of the cap plate to draw the sleeve head 30 toward the opposite face thereof, thereby exerting opposite pressures thereagainst to clamp the sleeve-head unit fixedly in position. The outer end portion of the spindle is formed to receive a knob 34 which may be tightly fitted thereon for manipulatively transmitting motions thereto whereby to operate the rheostat to control the motor A. Since the rheostat may be conventional in all essential respects, no further showing or description thereof need be given.

Supported upon the sleeve 29 adjacent its head 30 is a resilient spider plate S of fiber or the like, formed with a central opening for accommodation of the sleeve and provided with a plurality of radial arms 35, one opposite the motor A and one opposite each battery B, or seven altogether in the arrangement shown. A pair of pins 36 which are anchored at one end in the cap plate 20 extend fixedly therefrom to lie between two adjacent arms 35 of the spider plate S whereby to assure its retention in a predetermined rotative position when mounted upon the sleeve 29. When so positioned, the spider plate may rest against the boss 28 in response to a light pressure force proceeding from the opposite end of the housing H.

Contact studs $x$ and $y$ project, respectively, from the motor casing and rheostat body, and wiring connections thereto are used to establish an electrical circuit therewith. A contact button 37 is carried by each of the six radial arms 35 at its free end upon the face thereof which confronts the proximate battery end so as to be engaged thereby to establish an electrical connection therewith. A suggestive arrangement of the several batteries is indicated in FIG. 9 where the two batteries B furthest from the motor A present their positive poles coplanarly to the contact buttons 37 oppositely thereof, the remaining four batteries being disposed reversely to present their negative poles coplanarly to the remaining buttons, an electrical circuit being thereby assured in each case.

The circular body 22 of the housing constitutes a supporting frame with a plurality of parallelly-arranged circular openings 38 therethrough (see FIG. 8) providing individual cells for accommodation of (1) the motor A and (2) the batteries B, the latter being positioned oppositely of the contact buttons 37 as just noted. As by means of set screws 39 entered radially through the housing body 22 to engage the motor casing, the latter may be secured fixedly in place. Affixed to the inner face of the bearing plate 21, as by screws 40, are two separated arcuate conductor plates of unequal length, both of copper or the like. The shorter plate 41 mounts two contact buttons 42 whereas the longer plate 43 mounts four such buttons 42 in the arrangement shown. Each button 42 is disposed opposite the proximate end of one battery B in position to be engaged by the pole thereof when the bearing plate 21 is united to the circular body 22 of the housing. When so assembled, engagement of the buttons 42 with the battery poles tends to hold the batteries immovably against the resiliently mounted buttons 37 at the opposite end of the housing.

Electrical interconnections 44 between the buttons 37 and 42, omitted from FIG. 3, are diagrammatically shown in FIG. 9. According to this diagram, electrical connections extend in parallelism between each of three pairs of batteries which, in turn, are series-connected with each other. As a result, the amperage capacity of the battery system is doubled and the voltage output is trebled. If the potential of each battery be 1½ volts, that of the entire system will then be 4½ volts—a desirable potential for effective operation of a small powerful motor such as the one which should be chosen for use in the present power unit-reel assembly.

The reel shaft 19, which is disposed parallel with the motor drive shaft 45, is journaled for rotation in bearings 46 and 47, the former being supported within the bearing plate 21. The bearing 47 which also receives end thrusts from the shaft is supported upon the housing body 22. A hubbed collar 48 closely fitted onto the shaft engages also the bearing 46 and provides a seal therefor at the point of shaft emergence therefrom. Immediately adjacent the inner face of this bearing plate a ratchet wheel 49 is carried fast on the shaft 19 to cooperate with a spring-actuated pawl 50 which is pivotally supported as by a screw 51 affixed to the same plate. The pinion-gear transmission between the parallel reel and motor shafts 19 and 45, respectively, is the maximum in efficiency—an important consideration in assuring delivery of adequate power from a small compact motor to which energy is supplied by a battery system occupying only a minimum of space. Such a gear transmission provides a desired reduced speed in rotation of the reel shaft whose rotary movements are confined to a single direction by the pawl-ratchet mechanism regardless of the strength of any counter force which may normally be encountered.

The outer end portion of the reel shaft 19 is flatted at 52 where it is also provided with screw threads 53. The reel R is equipped with a spool carried freely upon this end portion of the shaft, whereas the friction brake F, also applied thereto, is formed with threads to cooperate with those upon the shaft. When rotatively advanced along the shaft, the brake is frictionally engaged with the reel spool, a braking force proportionate to the friction thus generated being concurrently applied to the reel. Since these two units may be conventional, as well as the manner of their cooperation, no further description thereof is believed necessary.

Desirably the reel spool is considerably greater in diameter than is it axial length, thereby to increase the length of each line winding thereupon. Control of the motor A is provided by a conventional, normally-open, switch 54 interposed in the electrical circuit (see FIG. 9) and operable selectively with the rheostat, to start, change speed, and stop the motor. This switch which is carried exteriorly of the housing H upon its side which is uppermost whenever the reel is in line-winding position, comprises a movable element operable by a depressible actuating button 56 conpeniently located for engagement by the fingers of the hand which is holding the rod when the latter is put to its intended use.

A line $l$ attached at one end to the reel spool to be wound or unwound relative thereto leads therefrom to the proximate guide 17 and thence through the remaining guides to the rod tip beyond which it continues free of restraint. Because of their graduated sizes, these guides define a slender cone having its axis coincident with the guide centers. In the normal operating position of the rod, a jointed bracket extends downwardly from the base plate 14 to provide for the housing H a swiveled mounting whereon the present motorized reel assembly is free to swing through 180 degrees between casting and winding positions. The arm 18 extending normally from the base plate constitutes one element of this jointed bracket. As best shown in FIGS. 10-14, the arm is in the general form of a strap which is bent and contoured to provide (a) a radial portion 57 rigidly joined to the base plate 14, (b) an intermediate portion 58 which is angled relative thereto both downwardly and laterally, and (c) a depending joint portion 59 having a pair of spaced cheeks 60 through which are aligned openings for reception of a pivot pin 61 (FIG. 14) such as the shank of a screw or bolt whose axis lies in a plane which is neither parallel with nor transverse to that of the rod, but substantially midway therebetween. Fitting between the two cheeks 60 is a tongue 63, also apertured for reception of the pivot pin 61 therethrough, this tongue being extended obliquely outwardly at an angle of approximately 45 degrees from a base plate 64 which is contoured to fit upon the exterior face of the circular body 22 of the housing H to which the base plate may be immovably secured by appropriate means such as screws 65. The fit of the tongue between the cheeks is such that it will engage the joint portion 59 of the arm 18 at each of the two extreme positions 180 degrees apart whereby to fix correspondingly the range of tongue movements therebetween. A jointed bracket of this general description provides upon the rod a swiveled mounting for the housing H whose turning movements of 180 degrees about the axis of the pivot pin 61 are accompanied by shifting the housing axis through only 90 degrees. In one position the housing axis is parallel with that of the rod, whereas in the other it is transverse thereto. Washers 66 of fiber, plastic or the like, are desirably fitted around the pivot pin to assure a swiveling movement which is smooth and free of lost motion. Detent means (not shown) may also be provided, as is common, to releasably hold the housing in each of its two operating positions. A nut 67 applied to the pivot pin assures its retention axially in operative position.

In the position for casting (FIGS. 1 and 11), the housing-reel axis is disposed parallel with that of the rod at a point therebelow and spaced therefrom sufficiently to accommodate the fingers of the hand when engaging the rod grip 11. In the winding position (FIGS. 2 and 11), the housing axis is disposed in a plane transversely of the rod, with the reel exteriorly of the housing located directly below the rod. A medial point lengthwise of the reel spool, approximately tangential with its top, then becomes aligned with the axis defined by the several guides 17 to facilitate an even distribution and level winding of the line l upon the spool concurrently with imposition by the guides of a minimum frictional resistance upon the line. In this position also the motor switch 54 is disposed topwise of the housing, spaced therefrom, and conveniently available for operation by one of the same fingers which engages the grip 11 for manipulation of the rod.

The housing H is advantageous in its design and construction in that its medial circular body 22 provides the sole mounting for all batteries as well as the motor. This component of the housing is amply sturdy and strong for all purposes of this invention. To complete the enclosure, the cap plate is added at one end and the bearing plate at the other, both desirably made of a suitable plastic material which is light, strong, inexpensive, and of high insulating value. It is therefore feasible to mount the button-carrying arcuate plates 41 and 43 directly on the bearing plate without any intervening insulation. Likewise, at the opposite housing end no special provision for insulation need be made since the enclosing cap plate is also of relatively non-conducting material. The points within the housing requiring interconnection by electrical wiring are but few and the distances short. Furthermore, all such wiring is confined to the space between the circular body 22 and the cap plate 20, leaving clear the space at the opposite housing end where the revolving gears are located. This is a most desirable and important arrangement in the interest of (1) separation of interconnecting wires from all moving parts, (2) concentration of all such wires in one end portion of the housing where they are conveniently accessible when the cap plate is removed, and (3) confinement of all moving parts within the opposite end portion of the housing where they are conveniently accessible for inspection, cleaning and lubrication when the bearing plate is removed.

It is further to be noted that the cap and bearing plates are removable, each independently of the other, so that opening up of either end of the housing for access thereto, as for example, for replacement of batteries therein, involves no disturbance of parts elsewhere in the housing. In this operation of changing batteries, there are no connections to be made or broken—simply removing the bearing plate together with the shaft and reel carried thereby, then tilting the housing sufficiently for the batteries to slide out, and finally fitting new batteries into their cells, followed by replacement of the bearing plate and its attaching screws. This operation may also be attended by cleaning or lubricating all moving parts which are then fully exposed to view. No problem is involved when the bearing plate is taken off—the gear simply slides away from the pinion to separate therefrom while remaining on the reel shaft as part of the removed brake-reel assembly, thereby exposing completely the working parts of this unit and also those still remaining within the housing chamber.

I claim:

1. A motorized fishing reel having a frame fixedly mounting a motor and, laterally thereof, a plurality of batteries, the frame comprising a disc-like body and a bearing plate carried by the body in spaced relation thereto and providing therewith an enclosed chamber, means for detachably securing the bearing plate fixedly to the frame body, removal of the bearing plate exposing one face of the frame body, the frame body being formed therethrough with parallel openings wherein the motor and batteries are fixedly mounted with one end of each exposed within the chamber, conduit means carried by the bearing plate in separable contact with the proximate battery ends to provide an electrical connection therebetween and with the motor, other complementary conduit means extending between the batteries and the motor to complete therebetween an electrical circuit for operation of the motor, a reel shaft rotatably carried by the bearing plate and extended beyond opposite faces thereof, a spool affixed to the reel shaft exteriorly of the bearing plate, a drive shaft extended from the motor into the chamber, means drivingly connecting the motor drive shaft with the reel shaft for operation thereof and freely separable therefrom when the bearing plate is disconnected from the body, and a mounting for the reel extended outwardly from the frame body for attachment to a fishing rod.

2. A motorized fishing reel having a frame mounting a motor and, laterally thereof, a battery means therefor in electrical connection therewith for operation of the motor, the frame comprising a disk-like body for supporting portions of the motor and battery means intermediately of their opposite ends, a bearing plate and a cap plate disposed adjacent to and in spaced relation with opposite faces of the body to confine the motor and battery means against endwise movement within the mountings therefor, means for detachably securing the bearing and cap plates to the frame body, walls extending between the body and the two plates oppositely thereof cooperating to provide an enclosed housing wherein the frame body is medially disposed to define therewithin two separated chambers wherein are exposed opposite end portions of the motor and battery means, a reel shaft journaled for rotation in the bearing plate and axially held therein in unitary relation therewith, the shaft being extended through the bearing plate to lie both interiorly and exteriorly of the housing, a driving connection between the motor and reel shaft within the housing chamber proximate to the bearing plate, a spool affixed to the reel shaft exteriorly of the housing, and a mounting for the reel extended outwardly from the frame body for attachment to a fishing rod.

3. A motorized fishing reel according to claim 2 wherein the battery means comprises a plurality of cells each having opposite battery poles exposed at its two ends, conduit means carried upon inner faces of the bearing and cap plates in positions oppositely of the proximate poles for contact therewith to complete a circuit therebetween, and the means for detachably securing both the bearing and cap plates to the frame body are screw means passing through the plates for screw threaded engagement with the frame body at points which compel rotative positioning of these plates correctly for proper contact of the conduit means with the respective proximate battery poles to be interconnected.

4. A motorized fishing reel according to claim 2 wherein the battery means comprises a plurality of cells each having opposite poles exposed at its two ends, conduit means carried upon the inner face of the bearing plate in positions oppositely of the proximate battery poles for contact therewith to complete a partial circuit therebetween, flexible conduit means are carried by the cap plate adjacent its inner face in positions oppositely of the proximate battery poles for contact therewith to complete the remaining circuit therebetween, and the means for detachably securing both the bearing and cap plates to the frame body are screw means passing through the plates for screw threaded engagement with the frame body at points which compel rotative positioning of these plates correctly for proper contact of the conduit means with the respective proximate battery poles to be interconnected into a single circuit.

5. A motorized fishing reel according to claim 2 wherein the battery means comprises a plurality of cells each having opposite poles exposed at its two ends, conduit means carried upon the inner face of the bearing plate in positions oppositely of the proximate battery poles for contact therewith to complete a partial circuit therebetween, flexible conduit means are carried by the cap plate adjacent its inner face in positions oppositely of the proximate battery poles for contact therewith, the flexible conduit means being in the form of a fixedly mounted spider with arms radiating outwardly from a common center adapted to receive between two of said arms one of the screw means whereby to fix the rotative position of all spider arms, and the means for detachably securing both the bearing and cap plates to the frame body are screw means passing through the plates for screw threaded engagement with the frame body at points which compel rotative positioning of these plates correctly for proper contact of the conduit means with the respective proximate battery poles to be interconnected into a single circuit.

6. A motorized fishing reel according to claim 3 wherein the conduit means in the two chambers are carried by the bearing and cap plates in positions oppositely of the poles of the proximate cells for contact therewith to complete a circuit therebetween, the conduit means in one of the chambers being resiliently biased toward the proximate poles for pressure contact therewith whereby to hold the cells firmly against the conduit means within the opposite chamber.

7. A motorized fishing reel having a frame fixedly mounting a motor and, laterally thereof, a plurality of interconnected battery cells in connection with the motor for operation thereof, the frame comprising a circular disk-like body and a bearing plate carried by the body in spaced relation thereto and providing therewith an enclosed chamber, means for detachably securing the bearing plate to the body, removal of the bearing plate exposing one face of the frame body, the frame body being formed with a plurality of circular openings disposed an equal distance from and axially parallel with the axis of the frame body and circularly thereof, the motor and battery cells being each mounted within one of the parallel openings and supported therein with one end portion of each extended into the chamber to be accessible for withdrawal from and/or replacement in its mounting, a reel shaft rotatably carried by the bearing plate and extended beyond opposite faces thereof, a spool affixed to the reel shaft exteriorly of the bearing plate, a drive shaft extended from the motor into the chamber, means drivingly connecting the motor drive shaft with the reel shaft for operation thereof and freely separable therefrom when the bearing plate is detached from the frame body, and a mounting for the reel extended outwardly from the frame body for attachment to a fishing rod.

8. A motorized fishing reel having a frame fixedly mounting a motor and, laterally thereof, a plurality of interconnected battery cells in connection with the motor for operation thereof, the frame comprising a circular disk-like body and a bearing plate carried by the body in spaced relation thereto and providing therewith an enclosed chamber, means for detachably securing the bearing plate to the body, removal of the bearing plate exposing one face of the frame body, the frame body being formed with a plurality of circular openings disposed an equal distance from and axially parallel with the axis of the frame body and circularly thereof, the motor and battery cells being each mounted within one of the parallel openings and supported therein with one end portion of each extended into the chamber to be accessible for withdrawal from and/or replacement in its mounting, the circular opening occupied by the motor being disposed off-axially of the chamber, a reel shaft rotatably carried by the bearing plate and extended axially of the reel beyond opposite faces of said bearing plate, a spool affixed to the reel shaft exteriorly of the bearing plate, a drive shaft extended from the motor into the chamber, means within the chamber drivingly connecting the motor drive shaft with the reel shaft for operation thereof and freely separable therefrom when the bearing plate is detached from the frame body, the means drivingly connecting the motor drive shaft with the reel shaft including a relatively small pinion on the former and a relatively large gear on the latter to operate the reel spool at a relatively reduced rate of speed, and a mounting for the reel extended outwardly from the frame body for attachment to a fishing rod.

9. A motorized fishing reel comprising a frame having a disk-like body, a motor and, laterally thereof, a cylindrical battery means having its axis parallel with those of the motor and reel and in electrical connection with the motor for operation thereof, a closure plate at one end of the disk-like body and a bearing plate carried by the body at its opposite end, the latter in spaced relation thereto and providing therewith an enclosed chamber, means for detachably securing the bearing plate fixedly to the frame body, removal of the bearing plate exposing the proximate face of the frame body, the frame body being formed with parallel openings, one adapted to receive the motor and another to receive the battery means with ends of the motor and battery means adjacent the bearing plate exposed within the chamber, the frame body providing for the motor and battery means fixed mounting in which the motor and battery means are confined within a common zone substantially midway between opposite ends of the reel, a reel shaft rotatably carried by the bearing plate and extended beyond opposite faces thereof, a spool affixed to the reel shaft exteriorly of the bearing plate, a drive shaft extended from the motor into the chamber, means drivingly connecting the motor drive shaft with the reel shaft for operation thereof and freely separable therefrom when the bearing plate is detached from the frame body, and a mounting for the reel extended outwardly from the frame body for attachment to a fishing rod.

10. A motorized fishing reel according to claim 9 wherein the closure plate is in the form of a cap spaced from the frame body and providing therewith a second chamber oppositely of and separated from the chamber adjacent the bearing plate, the electrical connection between the motor and battery means including a pair of separable contacts within the second chamber, means for detachably securing the cap to the frame body in a predetermined rotative position, and conductor means forming one of the pair of separable contacts carried by the cap and extended within the second chamber for contact with the companion contact therein to complete the electrical circuit between the motor and battery means only when the cap is secured to the frame body in its predetermined rotative position.

References Cited by the Examiner

UNITED STATES PATENTS

| | | | |
|---|---|---|---|
| 2,327,469 | 8/43 | Teitsma | 43—22 |
| 2,569,770 | 10/51 | McFate | 242—84.2 |
| 2,798,126 | 7/57 | Burge | 200—61.39 |
| 2,866,291 | 12/58 | Duell | 242—84.2 |
| 2,896,875 | 7/59 | Reed et al. | 242—84.53 |
| 3,032,290 | 5/62 | Wallace | 242—84.3 X |
| 3,039,716 | 6/62 | Visockis | 242—84.2 |
| 3,053,469 | 9/62 | King | 242—84.2 |
| 3,075,722 | 1/63 | Stealy et al. | 242—84.2 |
| 3,077,318 | 2/63 | DuVal | 242—84.1 |
| 3,116,892 | 1/64 | Pickard | 242—84.1 |

MARVIN STEIN, *Primary Examiner*